United States Patent Office.

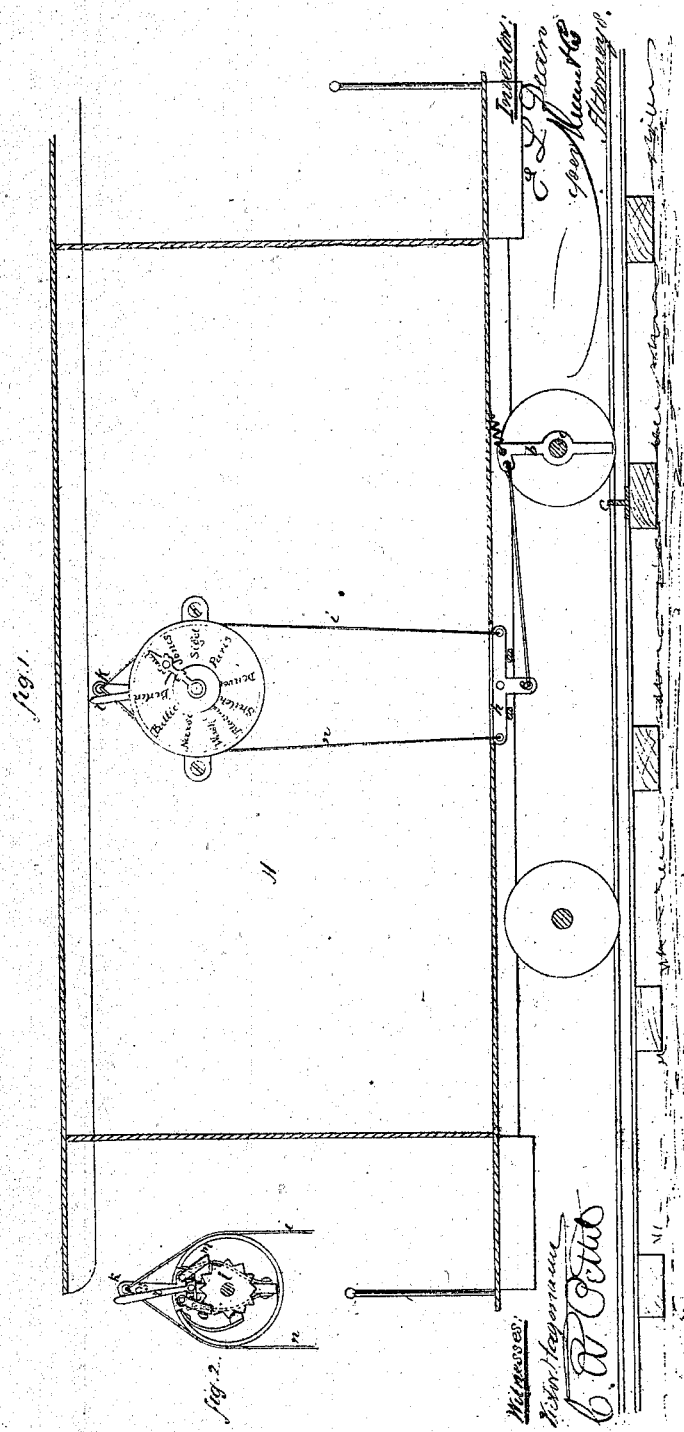

EDWARD L. DEAN, OF NEWBURG, OHIO.

Letters Patent No. 104,563, dated June 21, 1870.

IMPROVEMENT IN STREET AND STATION-INDICATORS FOR RAILROAD CARS.

The Schedule referred to in these Letters Patent and making part of the same.

*To all whom it may concern:*

Be it known that I, EDWARD L. DEAN, of Newburg, in the county of Cuyahoga and State of Ohio, have invented a new and improved Street and Station-Indicator for Railway Cars; and I do hereby declare that the following is a full, clear, and exact description of the same, reference being had to the accompanying drawing making a part of this specification, in which—

Figure 1 is a longitudinal vertical section through a car, showing the attachment of the index-operating wires to the moving apparatus, and Figure 2 is an elevation of the index-operating mechanism, the dial-plate being removed.

This invention has for its object to cause the index-finger of a dial-plate affixed to the inside of a street-car, to travel over its surface, and point out the names of streets and stations as they are successively reached.

The invention consists in attaching directly to the car-axle the lever that receives the impact of the flange, which projects upward from the track, which impact the lever transmits to the index-operating mechanism.

In the drawing—

A is a car.

*a*, one of its axles.

*b*, a lever, whose fulcrum is the axle *a*, which lever is held vertical by a spring arm at its top, connecting it with the bottom of the car, and allowing it the necessary motion.

The lower end of the lever *b* extends downward far enough to strike the flange *c*, which projects upward from the track at any point of which indication should be made on the dial.

When the lever and flange collide, the former is thrown backward until it is drawn over the latter, when its spring throws it once more into the vertical position.

The upper arm of the lever is joined, by means of the connecting-rod *d*, with the arm *e*, that projects downward from the center of the rocking lever *h*, pivoted, at its middle, to one side of the car-body, below the floor, and directly underneath the dial.

When the upper arm of the lever *b* is thrown forward, the right end of the lever *h* is drawn downward, and draws toward the right, by means of the connecting-rod *i*, the upper extremity of the bar *k*, which is pivoted, at its lower extremity, to the shaft of the toothed wheel *l*, which shaft bears the index-finger rigidly affixed to its outer end.

This movement of the bar *k* causes one of its pawls *m* to slip over one of the teeth of the wheel *l*.

The restoration of the lever *b* to the vertical position, in the manner before explained, causes the other connecting-rod *n* to draw the bar *k* back to its original station, during which movement the pawl *m* rotates the wheel *l*, and causes the index to move over the dial, and point to the name of the appropriate station.

The bar *k* is provided with a second pawl, *o*, similar in all respects to the pawl *m*, which, however, is only used when the other is inoperative, and which has to be held out of the way when the pawl *m* is in operation.

A lever, *r*, pivoted, at its lower end, to the bar *k*, between the two pawls, and provided with two arms, *t t*, projecting from it at right angles, on being thrown to the right of the pin *s* on the bar *k*, removes, by means of its bar *t*, the pawl *o* from contact with the wheel *l*.

Should it be desired to run the car back on the same track without turning it end for end, the lever *r* is moved to the left of the pin *s*, and then, by means of its arm *t*, the lever *r* removes the pawl *m* from contact with the wheel *l*, and allows the pawl *o* to act upon it.

The pawl *o* moves the wheel in the opposite direction from the pawl *m*, and causes the index to reverse its motion as required by the running back of the car.

The reason why the lever *b* is attached directly to the axle *a* is that it may move over the track steadily as the axle does, and so be always in position to strike the flanges, and not move up and down unevenly, as it would if fastened to the car-floor.

Having thus described my invention,

What I claim as new, and desire to secure by Letters Patent, is—

The lever *b*, attached directly to the car-axle, and combined with the index-operating mechanism, substantially as and for the purpose described.

EDWARD L. DEAN.

Witnesses:
CHAS. A. PETTIT,
T. P. SIMPSON.